United States Patent

Wright et al.

Patent Number: 5,250,603
Date of Patent: Oct. 5, 1993

[54] POLYMER/BI-LOBAL FIBER COMPOSITES HAVING IMPROVED STRENGTH

[75] Inventors: Roy F. Wright; Edwin Boudreaux, Jr., both of Bartlesville, Okla.

[73] Assignee: Phillips Petroleum Company, Bartlesville, Okla.

[21] Appl. No.: 824,971

[22] Filed: Jan. 24, 1992

[51] Int. Cl.$^5$ ............................................. C08K 7/14
[52] U.S. Cl. ........................... 524/494; 524/147; 524/496; 524/437; 524/444
[58] Field of Search ............... 524/494, 147, 496, 437, 524/444; 523/214

[56] References Cited

U.S. PATENT DOCUMENTS

| | | | |
|---|---|---|---|
| 4,528,310 | 7/1985 | Blackwell | 524/86 |
| 4,636,234 | 1/1987 | Huey et al. | 65/2 |
| 4,666,485 | 5/1987 | Huey | 65/2 |
| 4,840,986 | 6/1989 | Inoue et al. | 524/436 |
| 4,992,497 | 2/1991 | Wright | 524/147 |
| 5,079,290 | 1/1992 | Wright | 524/609 |

OTHER PUBLICATIONS

Owens-Corning Fiberglass Corporation Product Specification Sheet Pub. No. 1-PL-15612.

Primary Examiner—Paul R. Michl
Assistant Examiner—John J. Guarriello
Attorney, Agent, or Firm—Ryan N. Cross

[57] ABSTRACT

Processes and compositions for improving the mechanical properties of arylene sulfide polymers used in molding processes are described. A composition comprising poly(arylene sulfide) and bi-lobal fiber selected from the group consisting of glass, carbon, rock, slag, and combinations of any two or more thereof, is disclosed as useful in the molding of articles.

20 Claims, 1 Drawing Sheet

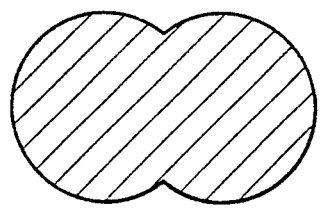
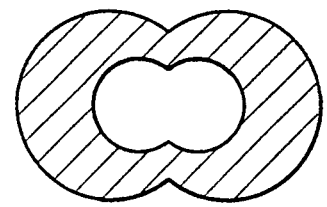
FIG. 1
FIG. 2
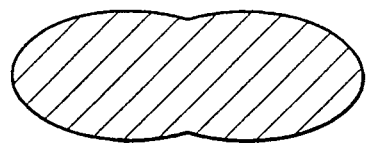
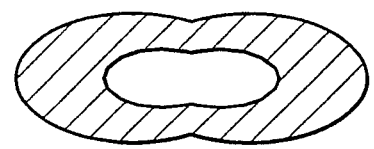
FIG. 3
FIG. 4

POLYMER/BI-LOBAL FIBER COMPOSITES HAVING IMPROVED STRENGTH

BACKGROUND OF THE INVENTION

1. Field of the Invention

The present invention relates generally to fiber-filled poly(arylene sulfide) compositions especially suitable for injection molding and methods of preparing and using such compositions to form molded products having improved mechanical properties. One embodiment of the present invention relates to bi-lobal glass fiber-filled poly(arylene sulfide) compositions and methods of preparing and using such compositions to form molded products having improved mechanical properties.

2. Description of the Prior Art

Poly(arylene sulfide) resin is a chemical-resistant high temperature thermoplastic which is particularly suitable for forming molded parts used in industrial applications. Glass-filled poly(arylene sulfide) products have good electrical insulation properties and are particularly suitable for producing parts utilized in electrical applications.

Glass filled poly(arylene sulfide) compositions containing organic silanes or organic phosphites are known in the art. For example, U.S. Pat. No. 4,528,310 discloses the addition of certain organosilanes to glass-filled poly(arylene sulfide) compositions to improve properties such as flow rate. Also, a basic patent in the field of glass fiber-reinforced poly(arylene sulfide) resins is U.S. Pat. No. 4,992,492. This patent discloses a composition having improved mechanical properties comprising a poly(arylene sulfide) resin, a glass reinforcement material, an epoxysilane, and an organic phosphite.

While molded products from the above-mentioned poly(arylene sulfide) compositions have good electrical insulation properties, there is a need for fiber-filled poly(arylene sulfide) compositions which when molded form products having improved mechanical properties, e.g. flexural strength, tensile strength, and impact resistance.

SUMMARY OF THE INVENTION

An object of this invention is to increase the flexural strength of composites comprising poly(arylene sulfide) and fiber.

Another object of this invention is to increase the tensile strength of composites comprising poly(arylene sulfide) and fiber.

A further object of this invention is to increase the impact resistance of composites comprising poly(arylene sulfide) and fiber.

In accordance with the present invention, a composite is produced from poly(arylene sulfide) and bi-lobal fiber. This composite composition improves flexural and tensile strength and impact resistance when compared to a composite with round fibers.

In accordance with another aspect of the present invention, there is provided a process for improving the mechanical properties of an injection molding poly(arylene sulfide) polymer comprising incorporating bi-lobal fiber into the poly(arylene sulfide), thereby forming a composition comprising said bi-lobal fiber and said poly(arylene sulfide).

BRIEF DESCRIPTION OF THE DRAWINGS

FIG. 1 illustrates an enlarged cross-sectional view of the preferred bi-lobal fiber useful in the present invention.

FIG. 2 shows an enlarged cross-sectional view of an alternative type of bi-lobal fiber having a hollow center.

FIG. 3 illustrates an enlarged cross-sectional view of another alternative type of bi-lobal fiber useful in the present invention.

FIG. 4 shows an enlarged cross-sectional view of another alternative type of bi-lobal fiber having a hollow center.

DESCRIPTION OF THE PREFERRED EMBODIMENTS

Molded products produced in accordance with the methods of the present invention using compositions of the present invention have unexpectedly significant increases in mechanical properties such as flexural strength, tensile strength, and impact resistance. These molded products can be used in a variety of applications including, but not limited to, automotive components, electronic parts, appliance components, pump housings, impellers, and valves.

The compositions of the present invention comprise polymer and bi-lobal fiber. In one embodiment, the composition of the present invention comprises poly(arylene sulfide) and bi-lobal mineral fiber. In another embodiment, the composition of the present invention comprises poly(arylene sulfide) and bi-lobal glass fiber. In the most preferred embodiment, the composition of the present invention comprises poly(phenylene sulfide) and bi-lobal glass fiber. In addition, the compositions may contain a variety of other additives, including, but not limited to, epoxysilanes, organic phosphites, mineral fillers such as talc or calcium sulfate, other reinforcing materials, corrosion inhibitors, bonding enhancers, plasticizers, and pigments.

The term "polymer" as used herein means a normally solid thermoplastic, synthetic, organic polymeric material, and includes, but is not limited to, homopolymers, copolymers, terpolymers and the like, and combinations of any two or more thereof.

The term "poly(arylene sulfide)" is used herein to broadly designate arylene sulfide resins whether homopolymers, copolymers, terpolymers, and the like, or a blend of such polymers. The term "uncured or partially cured" is used herein with respect to the arylene sulfide polymers to mean that the molecular weight of the polymers can be increased by supplying sufficient energy thereto such as by the application of heat or an oxidizing atmosphere to the polymers. The polymers are in the uncured or partially cured state during their recovery after synthesis prior to drying and curing.

Arylene sulfide polymers and poly(arylene sulfide) resins which are useful in accordance with the present invention are those described in U.S. Pat. Nos. 3,354,129, 3,919,177, 4,038,261, and 4,656,231. The disclosures of compositions and methods of making such compositions in the above-mentioned patents are incorporated herein by reference. A particularly preferred poly(arylene sulfide) is poly(phenylene sulfide) (PPS).

The fiber reinforcement material useful in producing composites of the present invention are multi-lobal mineral fibers. The term "mineral fiber" as used herein describes fibers of glass, carbon, rock, slag, basalt and combinations of any two or more thereof. "Multi-lobal"

mineral fibers as used herein describes mineral fibers whose cross-section is non-circular. Bi-lobal glass fibers are preferred because composites comprising bi-lobal glass fibers, when compared to composites comprising tri-lobal or circular glass fibers, show unexpected increases in flexural and tensile strengths and impact resistance. "Bi-lobal" fiber as used herein describes a fiber whose cross-section displays two curved or rounded projections or divisions, as illustrated in FIGS. 1-4.

Non-circular mineral fibers useful in the present invention are those produced by Owens-Corning Fiberglas Corporation of Toledo, Ohio. Methods of making non-circular mineral fibers are disclosed in U.S. Pat. Nos. 4,636,234 and 4,666,485. The disclosures of the above-mentioned patents are incorporated herein by reference.

A preferred composition of the present invention comprises poly(arylene sulfide) and bi-lobal fiber. A more preferred composition comprises poly(phenylene sulfide) and bi-lobal glass fiber. An even more preferred composition of the present invention comprises from about 25% to about 55% by weight bi-lobal glass fiber and from about 45% to about 75% by weight poly(phenylene sulfide), based on total composition weight. The most preferred composition of the present invention comprises from about 35% to about 45% by weight bi-lobal glass fiber and from about 55% to about 65% by weight poly(phenylene sulfide), based on total composition weight.

Suitable epoxysilanes for use in accordance with the present invention are represented by the formula:

$$Z_m-X-\underset{R_{(3-n)}}{\overset{(OR)_n}{Si}}$$

wherein
Z is

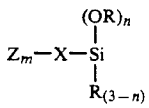, or 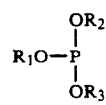

X is a linear or branched alkylene, arylene or arylalkylene hydrocarbon radical having from 1 to about 8 carbon atoms;

R is a hydrocarbon radical having from 1 to about 8 carbon atoms;

m is an integer of at least 1, and n is an integer of 1 to 3.

Examples of such epoxysilanes are 3-glycidoxypropyltrimethoxysilane, beta-(3,4-epoxycyclohexyl)ethyltrimethoxysilane, 3-glycidoxypropylmethyldiethoxysilane, and 2-glycidoxypropyltrimethoxysilane. The preferred epoxysilane is 3-glycidoxypropyltrimethoxysilane which is available from Union Carbide Corporation under the trade designation UCARSIL TM TC-100 ORGANOSILICON chemical. Generally, the epoxysilane utilized is included in a composition of the present invention in an amount in the range of from about 0.1% to about 2.0% by weight. Use of an epoxysilane additive tends to improve bonding between the polymer and the fiber additives.

Suitable organic phosphites for use in accordance with this invention are those represented by the formula:

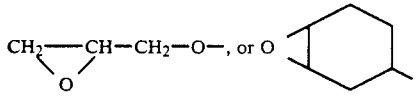

wherein
$R_1$ is an alkyl, aryl, cycloalkyl, alkylaryl, and arylalkyl radical having from 1 to about 20 carbon atoms, and $R_2$ and $R_3$ are independently hydrogen or $R_1$.

Examples of such organic phosphites include isobutyl phosphite, ethyl phosphite, cyclohexyl phosphite, phenyl phosphite, tridecyl phosphite, eicosyl phosphite, 1-naphthyl phosphite, 2-phenanthryl phosphite, 1-(3,5,7-triethylanthrycyl) phosphite, di(2-phenylethyl) phosphite, di(hexadecyl) phosphite, dicyclopentyl phosphite, dioctyl phosphite, diethyl phosphite, di(tridecyl) phosphite, dibutyl phosphite, diphenyl phosphite, didecyl phosphite, cyclohexyldecylphenyl phosphite, trioctyl phosphite, trimethyl phosphite, triethyl phosphite, tributyl phosphite, triisobutyl phosphite, tri(sec-butyl) phosphite, tri(tert-butyl) phosphite, trihexyl phosphite, tricyclohexyl phosphite, tri-(2-ethylhexyl) phosphite, triisooctyl phosphite, tri(tridecyl) phosphite, tri(heptadecyl) phosphite, tri(octadecyl) phosphite, trieicosyl phosphite, phenyldidecyl phosphite, phenyldi(hexadecyl) phosphite, phenyldi(nonadecyl) phosphite, diphenyldecyl phosphite, diphenylheptadecyl phosphite, diphenylnonadecyl phosphite, triphenyl phosphite, tri(p-octylphenyl) phosphite, tri(1-naphthyl) phosphite, tri(2-naphtyl) phosphite, tri(p-dodecylphenyl) phosphite, and the like, e.g., tris(nonylphenyl) phosphite.

Particularly suitable organic phosphites are those selected from the group consisting of triisooctyl phosphite, tricyclohexyl phosphite, triphenyl phosphite, and tris(nonylphenyl) phosphite. The most preferred organic phosphite is tris(nonylphenyl) phosphite.

A preferred composition of the present invention is comprised of poly(arylene sulfide) resin present in the composition in an amount in the range of from about 45% to about 75% by weight, bi-lobal fiber reinforcement material present in an amount in the range of from about 25% to about 55% by weight, an epoxysilane selected from the group consisting of 3-glycidoxypropyltrimethoxysilane, beta-(3,4-epoxycyclohexyl)ethyltrimethoxysilane, 3-glycidoxypropylmethyldiethoxysilane, and 2-glycidoxypropyltrimethoxysilane present in an amount in the range of from about 0.3% to about 1.5% by weight, and an organic phosphite selected from the group consisting of triisooctyl phosphite, tricyclohexyl phosphite, triphenyl phosphite and tris(nonylphenyl) phosphite present in an amount in the range of from about 0.3% to about 1.5% by weight, based on the weight of the total composition.

A more preferred composition of this invention is comprised of poly(phenylene sulfide) resin present in the composition in an amount in the range of from about 55% to about 65% by weight, bi-lobal fiber reinforcement material present in an amount in the range of from about 35% to about 45% by weight, 3-glycidoxypropyltrimethoxysilane present in an amount in the range of from about 0.3% to about 1.2% by weight and tri(- nonylphenyl)phosphite present in an amount in the range of from about 0.3% to about 1.2% by weight, based on the weight of the total composition. The most preferred bi-lobal fiber is bi-lobal glass fiber.

In addition, the composition of the present invention may contain other additives such as mold release agents. Mold release agents useful in the present invention include, but are not limited to, polyethylene and zinc stearate. The more preferred mold release agent is high density polyethylene, such as Phillips Petroleum Company's MARLEX TR161. A preferred weight percentage of mold release agent ranges from about 0.10% by weight to about 0.50% by weight, based on total composition weight.

Further, the composition of the present invention may contain corrosion inhibitors such as hydrotalcite or lithium carbonate. Hydrotalcite (e.g., the hydrotalcite sold by Kyowa Chemical Co., Ltd. of Osaka, Japan under the trade designation DHT-4A) in the range of about 0.5% to about 1.5% by weight, based on total composition weight, is the preferred corrosion inhibitor of the present invention.

The bi-lobal fiber-filled poly(arylene sulfide) composition can also contain one or more mineral fillers depending upon the particular use requirements involved. Suitable mineral fillers are those selected from the group consisting of talc, silica, clay, alumina, calcium sulfate, calcium carbonate, mica and mixtures thereof. The fillers can be in the form of, for example, powder, grain or fiber. The most preferred mineral filler is selected from the group consisting of calcium sulfate and talc. When a mineral filler is used in a composition of the present invention, it is included therein in an amount in the range of from about 5% to about 50% by weight, more preferably from about 15% to about 35% by weight.

The molding compositions of this invention which upon being molded result in products having improved mechanical properties are prepared by mixing poly(arylene sulfide) and bi-lobal fiber reinforcement material, and optionally, an epoxysilane, an organic phosphite, a corrosion inhibitor, a mold release agent and mineral filler, in the amounts set forth above to form a homogenous mixture. Many suitable methods of mixing the components are well known to those skilled in the art. By way of example, the components of the compositions can be mixed together at room temperature in a rotating drum blender or in an intensive mixer such as a Henschel mixer to form a homogeneous mixture of components. Alternatively, the epoxysilane and organic phosphite can be premixed with the fiber reinforcement material and filler, if used, before the poly(arylene sulfide), and other components, if any, are combined to form a homogeneous mixture. The homogeneous mixture of components can be extrusion compounded at a temperature above the melting point of the resin to produce a uniform composition. The extrudate can be in strand, sheet, or tape form.

A further understanding of the present invention and its advantages will be provided by reference to the following examples. The examples are provided merely to illustrate the practice of the invention and should not be read as limiting the scope of the invention or the appended claims in any way. Reasonable variations and modifications, not departing from the essence and spirit of the invention, are contemplated to be within the scope of patent protection desired and sought.

EXAMPLES

Example I

For Run 1, a mixture of 58.75% by weight poly(phenylene sulfide) (Phillips Petroleum Company RYTON® PPS, uncured, having a melt flow of 280 grams in 10 minutes measured in accordance with ASTM D1238, condition 315/5.0); 40% by weight glass fibers (497EE, round, 9 micron diameter, 3/16 inch length, Owens-Corning Fiberglas Corporation); 0.25% by weight high density polyethylene (Phillips Petroleum Company MARLEX® TR161); and 1% by weight of a hydrotalcite (Kyowa Chemical Industry Company DHT-4A) were dry blended and extruded through a Davis-Standard extruder, 1.5 inch diameter and 24:1 L:D ratio at a temperature of about 630° F. A metering screw with 3:1 compression ratio was used at 80 rpm. The melt was extruded through a strand die and chopped into coarse granules. The granules were heated in a forced air oven at 300° F. for 2 hours just before molding. The granules were then molded into test specimen Type 4 tensile and impact bars (5"×$\frac{1}{2}$"×$\frac{1}{8}$") in an Arburg ECO injection molding machine with about a 600° F. barrel temperature and about 275° F. mold temperature. The molded specimen bars were then annealed in an oven at 400° F. for about 2 hours. The bars were cooled to room temperature before testing for mechanical properties. Flexural strength was measured by ASTM D790, tensile strength by ASTM D638, Izod impact resistance by ASTM D256, and hydrolytic stability by ASTM D638 after conditioning the test specimens for 150 hours at 250° F. in water at 15 psi. The results of the testing on Run 1 specimen bars are given in Table I.

For Run 2, a second composition was prepared, the components of which were the same as those in the Run 1 composition except that the glass fiber was bi-lobal (497DB-BF-02, bi-lobal, 9 micron equivalent diameter, 3/16 inch length, Owens-Corning Fiberglas Corporation). The results of the testing on Run 2 specimen bars are given in Table I.

For Run 3, a second composition was prepared, the components of which were the same as those in the Run 1 composition except that the glass fiber was tri-lobal (497DB-TF-01, tri-lobal, 9 micron equivalent diameter, 3/16 inch length, Owens-Corning Fiberglas Corporation). The results of the testing on Run 3 specimen bars are given in Table I.

TABLE I

| Experimental Non-Round Glass Fibers | | | |
|---|---|---|---|
| Fiberglass Type | Run 1 Round | Run 2 Bilobal | Run 3 Trilobal |
| PPS wt. % | 58.75 | 58.75 | 58.75 |
| Glass wt. % | 40.0 | 40.0 | 40.0 |
| Hydrotalcite wt. % | 1.0 | 1.0 | 1.0 |
| Polyethylene wt. % | 0.25 | 0.25 | 0.25 |
| Flexural strength, psi (× 1000) | 36.9 | 40.0 | 33.3 |
| Tensile, psi (× 1000) | 21.6 | 26.1 | 21.6 |
| Izod impact, ft-lb/inch | | | |
| Notched | 2.0 | 1.9 | 1.6 |
| Unnotched | 11.4 | 14.0 | 10.5 |

Table I (Runs 1-3) illustrates that the bi-lobal fiberglass composites unexpectedly improved flexural strengths, tensile strengths and impact resistance over the round and tri-lobal composites. Thus, composites comprising poly(arylene sulfide) and bi-lobal glass fibers demonstrated the improved strengths which are the objects of this invention.

Example II

The preparation of the molding compositions and the testing of molded specimen bars as described in Example I were repeated except that 0.8% by weight of poly(phenylene sulfide) was replaced by 0.8% by weight of 3-glycidoxypropyltrimethoxysilane (TC-100, Union Carbide Company), and no tri-lobal fiberglass composite was prepared.

Thus, for Run 4, the composition comprised 57.95% PPS, 40% round glass fiber, 1% hydrotalcite, 0.25% polyethylene, and 0.8% 3-glycidoxypropyltrimethoxysilane by weight.

For Run 5, the composition comprised 57.95% PPS, 40% bi-lobal glass fiber, 1% hydrotalcite, 0.25% polyethylene, and 0.8% 3-glycidoxypropyltrimethoxysilane by weight.

The results of the testing on Runs 4 and 5 specimen bars are reported in Table II.

TABLE II

| Bilobal Glass with Silane Added | | |
| --- | --- | --- |
| Fiberglass Type | Run 4 Round | Run 5 Bilobal |
| PPS wt. % | 57.95 | 57.95 |
| Glass wt. % | 40.0 | 40.0 |
| DHT-4A - Hydrotalcite wt. % | 1.0 | 1.0 |
| TR-161 - Polyethylene wt. % | 0.25 | 0.25 |
| TC-100 - 3-glycidoxy-propyltrimethoxysilane wt. % | 0.8 | 0.8 |
| Flexural strength, ksi | 41.7 | 40.7 |
| Tensile, ksi | 27.3 | 29.3 |
| Izod impact, ft-lb/inch | | |
| Notched | 1.8 | 1.9 |
| Unnotched | 17.2 | 17.8 |

The results of Example II, Runs 4 and 5, indicate bi-lobal fiberglass composites with 3-glycidoxypropyltrimethoxysilane demonstrate improvements in tensile strength and Izod impact resistance over round fiberglass composites with 3-glycidoxypropyltrimethoxysilane, while a minor decrease in flexural strength occurred. This example demonstrates achievement of at least two of the objects of this invention, namely, improved tensile strength and impact strength.

The examples have been provided merely to illustrate the practice of the invention and should not be read so as to limit the scope of the invention or the appended claims in any way. Reasonable variation and modification, not departing from the essence and spirit of the invention, are contemplated to be within the scope of patent protection desired and sought.

That which is claimed is:

1. A composition comprising:
   (a) poly(arylene sulfide) in an amount from about 45% to about 75% by weight of said total composition; and
   (b) bi-lobal fiber in an amount from about 25% to about 55% by weight of said total composition.

2. A composition according to claim 1, wherein said bi-lobal fiber is selected from the group consisting of glass, carbon, rock, slag, basalt, and combinations of any two or more thereof.

3. A composition according to claim 1, wherein said poly(arylene sulfide) is poly(phenylene sulfide).

4. A composition according to claim 1, wherein said bi-lobal fiber is a bi-lobal glass fiber.

5. A composition according to claim 1, wherein said poly(arylene sulfide) is poly(phenylene sulfide) and said bi-lobal fiber is bi-lobal glass fiber.

6. A composition according to claim 1, wherein said composition comprises from about 35% to about 45% by weight bi-lobal fiber and from about 65% to about 55% by weight poly(arylene sulfide), based on total composition weight.

7. A composition according to claim 1, further comprising polyethylene, hydrotalcite, and an epoxysilane.

8. A composition according to claim 7, wherein said composition comprises from about 55% to about 65% by weight poly(arylene sulfide), from about 35% to about 45% by weight bi-lobal fiber, from about 0.5% to about 1.5% by weight hydrotalcite, from about 0.5% to about 1.0% by weight epoxysilane, and from about 0.1% to about 0.5% by weight polyethylene, based on total composition weight.

9. A composition according to claim 1, further comprising an organic phosphite and an epoxysilane.

10. A composition according to claim 9, wherein said composition comprises from about 45% to about 75% by weight poly(arylene sulfide), from about 25% to about 55% by weight bi-lobal fiber, from about 0.3% to about 1.5% by weight epoxysilane, and from about 0.3% to about 1.5% by weight organic phosphite, based on total composition weight.

11. A process for improving the mechanical properties of an injection molding poly(arylene sulfide) polymer comprising incorporating bi-lobal fiber into said poly(arylene sulfide) polymer, thereby forming a composition comprising from about 45% to about 75% by weight of said poly(arylene sulfide) polymer and from about 25% to about 55% by weight of said bi-lobal fiber, based on total composition weight.

12. A process according to claim 12, wherein said bi-lobal fiber is selected from the group consisting of glass, carbon, rock, slag, basalt, and combinations of any two or more thereof.

13. A process according to claim 12, wherein said poly(arylene sulfide) is poly(phenylene sulfide).

14. A process according to claim 12, wherein said bi-lobal fiber is a bi-lobal glass fiber.

15. A process according to claim 12, wherein said poly(arylene sulfide) is poly(phenylene sulfide) and said bi-lobal fiber is bi-lobal glass fiber.

16. A process according to claim 11, wherein said composition comprises from about 35% to about 45% by weight bi-lobal fiber and from about 65% to about 55% by weight poly(arylene sulfide), based on total composition weight.

17. A process according to claim 11, wherein said composition further comprises polyethylene, hydrotalcite, and an epoxysilane.

18. A composition according to claim 17, wherein said composition comprises from about 55% to about 65% by weight poly(arylene sulfide), from about 35% to about 45% by weight bi-lobal fiber, from about 0.5% to about 1.5% by weight hydrotalcite, from about 0.5% to about 1.0% by weight epoxysilane, and from about 0.1% to about 0.5% by weight polyethylene, based on total composition weight.

19. A composition according to claim 11, further comprising an organic phosphite and an epoxysilane.

20. A process according to claim 19, wherein said composition comprises from about 45% to about 75% by weight poly(arylene sulfide), from about 25% to about 55% by weight bi-lobal fiber, from about 0.3% to about 1.5% by weight epoxysilane, and from about 0.3% to about 1.5% by weight organic phosphite, based on total composition weight.

* * * * *